J. De MOSS.
HARROW.

No. 181,054. Patented Aug. 15, 1876.

WITNESSES:
C. Neveux
John Goethals

INVENTOR:
J. De Moss
BY
Munn & Co.
ATTORNEYS.

UNITED STATES PATENT OFFICE.

JACKSON DE MOSS, OF NOBLESVILLE, INDIANA.

IMPROVEMENT IN HARROWS.

Specification forming part of Letters Patent No. 181,054, dated August 15, 1876; application filed June 26, 1876.

*To all whom it may concern:*

Figure 1:
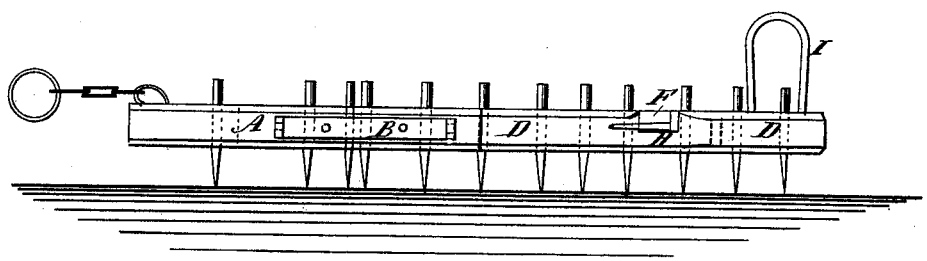
Figure 2:
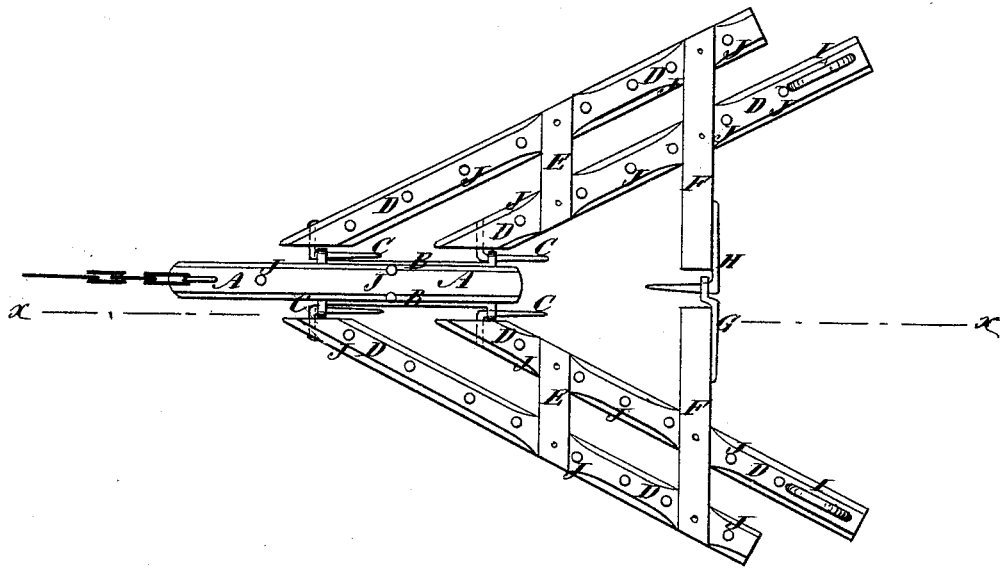

Be it known that I, JACKSON DE MOSS, of Noblesville, in the county of Hamilton, and in the State of Indiana, have invented a new and Improved Harrow, of which the following is a specification:

Figure 1 is a longitudinal section of my improved harrow, taken through the line $x\ x$, Fig. 2. Fig. 2 is a top view of the same.

The object of this invention is to furnish an improved harrow or pulverizer which shall be simple in construction, convenient in use, and effective in operation, thoroughly pulverizing the ground, and adjusting itself to an irregular surface, so that it will level down a ridge and fill up a dead furrow with equal effectiveness, which may be easily cleared of rubbish, raised to pass an obstruction, and may be easily loaded upon and unloaded from a vehicle for transporting it from place to place.

A is the central or longitudinal bar or beam of the harrow, to the forward end of which the draft is applied, and to the opposite sides of the rear part of which are attached iron bars B, having an eye formed upon each end, to receive the hooks C, attached to the forward ends of the inclined bars D of the wings or side parts of the harrow. The forward parts of the inclined bars D of each wing are connected by a cross-bar, E, and their rear parts are connected by a cross-bar, F. The cross-bars F project inward, so as to nearly meet, and to one is attached an eye-bar, G, to receive a hook, H, attached to the other.

By this construction both wings can incline downward or upward, or one can incline downward and the other upward, as the surface of the ground may require.

To the rear end of the inner bar D of each wing is attached an arched or bow handle, I, the plane of which is longitudinal with the said bar, so that the said handles will never be in the way, and at the same time will always be in a convenient position for use.

The rear hook H may have a pin passed through it to prevent the harrow-frame from coming apart when in use.

J are the teeth, three of which are attached to the center bar A, and the others are attached to the inclined bars D of the wings. The teeth J should be so arranged that no two of them will travel in the same track, and may be so arranged that their tracks may be an inch or any other desired distance apart.

By removing the teeth J from the central beam A the harrow may be used for cultivating small corn, or other small plants planted in rows, loosening the soil upon both sides of the row at the same time.

With this construction, by removing the pin from the hook H and pushing the left-hand wing forward, the harrow will come apart, and may be easily loaded upon a vehicle.

Having thus described my invention, what I claim as new, and desire to secure by Letters Patent, is—

The combination of the central bar A, provided with the eye-bars B, the wings D E F, the hooks C H, and the eye-bar G, with each other, substantially as herein shown and described.

JACKSON DE MOSS.

Witnesses:
ISAAC S. POE,
JOHN R. MEKKER.